(12) United States Patent
Ido et al.

(10) Patent No.: US 10,946,491 B2
(45) Date of Patent: Mar. 16, 2021

(54) MOVEMENT ERROR IDENTIFICATION METHOD FOR MACHINE TOOL

(71) Applicant: DMG MORI CO., LTD., Nara (JP)

(72) Inventors: Yutaka Ido, Nara (JP); Masahiro Shimoike, Nara (JP)

(73) Assignee: DMG Mori Co., Ltd., Nara (JP)

( * ) Notice: Subject to any disclaimer, the term of this patent is extended or adjusted under 35 U.S.C. 154(b) by 86 days.

(21) Appl. No.: 16/470,915

(22) PCT Filed: Oct. 27, 2017

(86) PCT No.: PCT/JP2017/038842
§ 371 (c)(1),
(2) Date: Jun. 18, 2019

(87) PCT Pub. No.: WO2018/116635
PCT Pub. Date: Jun. 28, 2018

(65) Prior Publication Data
US 2020/0086444 A1    Mar. 19, 2020

(30) Foreign Application Priority Data
Dec. 22, 2016    (JP) ................ JP2016-249163

(51) Int. Cl.
*G05B 19/404*    (2006.01)
*B23Q 17/00*    (2006.01)

(52) U.S. Cl.
CPC ......... *B23Q 17/003* (2013.01); *G05B 19/404* (2013.01); *G05B 2219/49* (2013.01)

(58) Field of Classification Search
CPC .................................................. G05B 19/404
(Continued)

(56) References Cited

U.S. PATENT DOCUMENTS

| 5,678,964 | A | 10/1997 | Dashevsky | |
| 2008/0114485 | A1* | 5/2008 | Katoh | G05B 19/404 700/193 |

(Continued)

FOREIGN PATENT DOCUMENTS

| JP | S61209857 A | 9/1986 |
| JP | H08152909 A | 6/1996 |

(Continued)

*Primary Examiner* — Hien D Khuu
(74) *Attorney, Agent, or Firm* — Miller, Matthias & Hull LLP

(57) ABSTRACT

A motion error of a machine tool in a coordinate system having its origin at an arbitrary position is identified by means of error data measured by a commonly-used method. An X-axis feed mechanism, a Y-axis feed mechanism, and a Z-axis feed mechanism are operated in a three-dimensional space of a machine coordinate system to measure translational errors, angular errors, and perpendicularity errors thereof, and error data for translational error parameters, angular error parameters, and perpendicularity error parameters in a three-dimensional space of a set coordinate system having its origin at a preset reference position $X_a$, $Y_a$, $Z_a$ are derived based on the measured actual error data. Subsequently, a relative motion error between a spindle and a table in the three-dimensional space of the set coordinate system is derived based on the derived error data.

8 Claims, 3 Drawing Sheets

(58) Field of Classification Search
USPC .......................................................... 700/174
See application file for complete search history.

(56) References Cited

U.S. PATENT DOCUMENTS

| | | | |
|---|---|---|---|
| 2014/0297022 A1* | 10/2014 | Uenishi | G05B 19/404 |
| | | | 700/160 |
| 2015/0160049 A1* | 6/2015 | Oki | G01B 5/20 |
| | | | 702/97 |
| 2015/0277424 A1* | 10/2015 | Kondo | G05B 19/402 |
| | | | 700/193 |
| 2018/0079009 A1* | 3/2018 | Fujii | B23B 3/26 |
| 2018/0133860 A1* | 5/2018 | Fujita | B23Q 17/22 |
| 2018/0150049 A1* | 5/2018 | Schranz | G05B 19/401 |

FOREIGN PATENT DOCUMENTS

| | | |
|---|---|---|
| JP | 2008269316 A | 11/2008 |
| JP | 2015069355 A | 4/2015 |
| WO | 2012101788 A1 | 8/2012 |

* cited by examiner

MOVEMENT ERROR IDENTIFICATION METHOD FOR MACHINE TOOL

TECHNICAL FIELD

The present invention relates to a method of identifying a relative motion error between a spindle for holding a tool and a table for mounting a workpiece thereon in a machine tool configured to move the spindle and the table relative to each other in directions of three orthogonal axes, an X-axis, a Y-axis, and a Z-axis.

BACKGROUND ART

Conventionally, positioning errors in X-axis, Y-axis, and Z-axis feed axes (i.e., an X-axis feed mechanism, a Y-axis feed mechanism, and a Z-axis feed mechanism) and straightness in the feed axes are taken into account as factors contributing to a motion error in a machine tool. In order to compensate for such a motion error, a numerical controller as disclosed in Japanese Unexamined Patent Application Publication No. H8-152909 (Patent Literature 1 listed below) has been proposed.

This numerical controller, as disclosed in Patent Literature 1, includes grid-point-compensation-vector storing means that stores therein grid-point compensatio vectors which are measured in advance at grid points of a grid area defined by dividing a coordinate system at certain intervals in each coordinate-axis direction, interpolating means that outputs an interpolation pulse for each feed axis in accordance with a movement command, current-position recognizing means that recognizes a current position in each feed axis by adding the interpolation pulse, current-position-compensation-vector calculating means that calculates a current-position compensation vector at the current position based on the grid-point compensation vectors, compensation-pulse outputting means that compares the current-position compensation vector with a start-point compensation vector at the previous current position before interpolation and outputs an amount of change as a compensation pulse, and adding means that adds the compensation pulse to the interpolation pulse.

With this numerical controller, each time an interpolation pulse is output, a three-dimensional compensation vector at a current position is calculated and the calculated three-dimensional compensation vector is added as a compensation pulse to the interpolation pulse. Therefore, a positional error that is caused by a mechanical system in a three-dimensional space can be compensated for by a single interpolation-type error compensation function.

Note that the grid-point compensation vector at each grid point of the grid area is obtained by measuring a positioning error of a reference point in a three-dimensional space occurring in controlling positioning in the feed axes with a certain interval, the reference point being set as appropriate on the axis of the spindle. Further, the measurement is typically carried out with a laser interferometer, a laser length measuring device, an auto-collimator, or the like. Furthermore, the reference point is typically set at, for example, a position at which the axis of the spindle intersects with a front end surface of the spindle or a position which is located forward away from the front end surface of the spindle by a predetermined distance on the axis of the spindle; the reference point is determined as appropriate depending on the measurement method.

Recently, a motion error (positioning error) in a three-dimensional space in a machine tool are considered to occur with errors in translational motions in the feed axes, angular errors in the feed axes, and errors concerning perpendicularities between the feed axes affecting one another, as shown in FIG. 4. Therefore, an accurate motion error can be identified by calculating these errors. Note that the definitions of the errors shown in FIG. 4 are as follows:

$E_{XX}$ is a positioning error in the X-axis direction in the X-axis feed mechanism;
$E_{YY}$ is a positioning error in the Y-axis direction in the Y-axis feed mechanism;
$E_{ZZ}$ is a positioning error in the Z-axis direction in the Z-axis feed mechanism;
$E_{YX}$ is a straightness error (in the Y-axis direction) in a plane defined by the X-axis and the Y-axis in the X-axis feed mechanism;
$E_{ZX}$ is a straightness error (in the Z-axis direction) in a plane defined by the X-axis and the Z-axis in the X-axis feed mechanism;
$E_{XY}$ is a straightness error (in the X-axis direction) in a plane defined by the Y-axis and the X-axis in the Y-axis feed mechanism;
$E_{ZY}$ is a straightness error (in the Z-axis direction) in a plane defined by the Y-axis and the Z-axis in the Y-axis feed mechanism;
$E_{XZ}$ is a straightness error (in the X-axis direction) in a plane defined by the Z-axis and the X-axis in the Z-axis feed mechanism;
$E_{YZ}$ is a straightness error (in the Y-axis direction) in a plane defined by the Z-axis and the Y-axis in the Z-axis feed mechanism;
$E_{AX}$ is an angular error around the X-axis in the X-axis feed mechanism;
$E_{AY}$ is an angular error around the X-axis in the Y-axis feed mechanism;
$E_{AZ}$ is an angular error around the X-axis in the Z-axis feed mechanism;
$E_{BX}$ is an angular error around the Y-axis in the X-axis feed mechanism;
$E_{BY}$ is an angular error around the Y-axis in the Y-axis feed mechanism;
$E_{BZ}$ is an angular error around the Y-axis in the Z-axis feed mechanism;
$E_{CX}$ is an angular error around the Z-axis in the X-axis feed mechanism;
$E_{CY}$ is an angular error around the Z-axis in the Y-axis feed mechanism;
$E_{CZ}$ is an angular error around the Z-axis in the Z-axis feed mechanism;
$A_0Z$ is an angular error around the X-axis between the Z-axis feed mechanism and an ideal Z-axis;
$B_0Z$ is an angular error around the Y-axis between the Z-axis feed mechanism and the ideal Z-axis; and
$C_0Y$ is an angular error around the Z-axis between the Y-axis feed mechanism and an ideal Y-axis.

Note that other conceivable error factors are an angular error $A_0Y$ around the X-axis between the Y-axis feed mechanism and the ideal Y-axis, an angular error $B_0X$ around the Y-axis between the X-axis feed mechanism and an ideal X-axis, and an angular error $C_0X$ around the Z-axis between the X-axis feed mechanism and the ideal X-axis.

As for a method for measuring these errors, a measurement method using a measurement apparatus as shown in FIG. 5 has been proposed. Note that the machine tool 50 shown in FIG. 5, which is shown by way of example only, is composed of a bed 51 having a workpiece placement surface (i.e., table) on the top thereof, a portal frame 52, and a saddle 53. The frame 52 is disposed such that a horizontal portion thereof is positioned above the bed 51, and two vertical portions thereof are engaged with the sides of the bed 51 to allow the frame 52 to move as a whole in the Y-axis direction. The saddle 53 is engaged with the horizontal portion of the frame 52 and is configured to be movable in the X-axis direction along the horizontal portion of the frame 52. Further, a spindle 54 is held by the saddle 53 in a manner to be movable in the Z-axis direction and rotatable about an axis parallel to the Z-axis. The X-axis, the Y-axis, and the Z-axis are reference axes that are orthogonal to one another, and feed axes corresponding to the reference axes are respectively constituted by an X-axis feed mechanism (not shown), a Y-axis feed mechanism (not shown), and a Z-axis feed mechanism (not shown).

The above-mentioned errors are measured with a laser length measuring device 101 disposed on the bed 51 as well as a mirror 102 attached to the spindle 54. Specifically, first, the laser length measuring device 101 is arranged at a predetermined position, for example, the position indicated by the solid line in FIG. 5, and the mirror 102 is attached to the spindle 54. Thereafter, positioning in the X-axis feed mechanism, positioning in the Y-axis feed mechanism, and positioning in the Z-axis feed mechanism are controlled with a certain interval to sequentially position the mirror 102 at each grid point of a three-dimensional space that is divided in a grid-like pattern with the certain interval, and at each grid point, a laser beam is irradiated from the laser length measuring device 101 to the mirror 102 and a reflected light of the laser beam is received by the laser length measuring device 101, whereby the distance between the laser length measuring device 101 and the mirror 102 is measured by the laser length measuring device 101.

Subsequently, the laser length measuring device 101 is sequentially arranged at three other different positions (for example, the positions indicated by the broken lines in FIG. 5), and at each of the three different positions, similarly to the initial measurement, the mirror 102 is sequentially positioned at each grid point of the three-dimensional space and, at each grid point, the distance between the laser length measuring device 101 and the mirror 102 is measured by the laser length measuring device 101. In this process, the mirror 102 is arranged at a height position different from that in the initial measurement with respect to the laser length measuring device 101 at at least one of the three different positions.

Based on the measurement data obtained in the above-described manner, the position of the mirror 102 at each grid point of the three-dimensional space is calculated in accordance with the principle of triangulation. Further, based on the calculated position data and analysis of the position data, the above-mentioned errors are obtained.

However, the measurement method using the laser length measuring device 101 has a problem that the laser length measuring device 101 per se is expensive, and further has a problem that the measurement requires long time and is complicated and troublesome in operation because it is necessary to sequentially arrange the laser length measurement device 101 at four positions, and at each of the four positions, sequentially position the mirror 102 at each grid point of the three-dimensional space to carry out the measurement.

At the same time, the translational motion errors in the feed axes and the angular errors in the feed axes can be measured in accordance with an already established measurement method, as provided in JIS B 6190-2, JIS B 6336-1, and JIS B 6336-2. Further, as for the errors $A_0Z$, $B_0Z$, $C_0Y$, etc. regarding the perpendicularities between the X-axis, the Y-axis, and the Z-axis, a measurement method using a double ball bar as disclosed in Non-Patent Literature 1 listed below has been proposed.

Accordingly, the above-mentioned errors can be measured by means of these methods without depending on the above-described measurement method using the laser length measuring device 101 and the mirror 102.

CITATION LIST

Patent Literature

Patent Literature 1: Japanese Unexamined Patent Application Publication No. H8-152909

NON-PATENT LITERATURE

Non-Patent Literature 1: Yoshiaki Kakino, Yukitoshi Ihara, and Yoshio Nakatsu: "A Study on the Motion Accuracy of NC Machine Tools (2nd Report)", Journal of the Japan Society for Precision Engineering, 52/10/1986 pp. 73-79

SUMMARY OF INVENTION

Technical Problem

The above-described motion error of the spindle (specifically, the reference point) in a three-dimensional space has to be compensated for eventually. Therefore, typically, for control reasons, a motion error in a three-dimensional space of a machine coordinate system that is defined with respect to the so-called machine zero has to be identified.

However, where the perpendicularity errors between the X-axis, the Y-axis, and the Z-axis are measured with a double ball bar as mentioned above, there is a problem that it is not possible to measure the errors with respect to the machine zero. That is to say, in order to measure the perpendicularity errors with respect to the machine zero with a double ball bar, it is necessary to turn the spindle which has the double ball bar attached thereto about the machine zero with the length of the bar as a turning radius. However, the feed axes do not allow movement in the negative direction beyond the machine zero; therefore, such a turning operation cannot be realized.

The above-mentioned errors $E_{XX}$, $E_{YY}$, $E_{ZZ}$, $E_{YX}$, $E_{ZX}$, $E_{XY}$, $E_{ZY}$, $E_{XZ}$, $E_{YZ}$, $E_{AX}$, $E_{AY}$, $E_{AZ}$, $E_{BX}$, $E_{BY}$, $E_{BZ}$, $E_{CX}$, $E_{CY}$, and $E_{CZ}$ are theoretically considered to be affected by the perpendicularity errors $A_0Z$, $B_0Z$, $C_0Y$, etc. Therefore, it is conceivable that these errors also cannot be identified with respect to the machine zero.

Thus, when the measurement methods provided in the JIS and the method disclosed in Non-Patent Literature 1 are used, the motion error in the three-dimensional space of the machine coordinate system cannot be identified immediately based on measurement values of the methods. However, if it is possible to identify the motion errors in the three-dimensional space of the machine coordinate system based on measurement values measured by these methods, there is an advantage in cost because the laser length measuring device 101 as shown in FIG. 5 that is expensive is not required. Further, it is also advantageous that it is not necessary to measure a positional error at each grid point set in the three-dimensional space of the mechanical coordinate system; therefore, the measurement can be carried out more simply than the measurement using the laser length measuring device 101.

Further, if it is possible to identify the motion error in a three-dimensional space of a coordinate system having its origin at an arbitrary reference position based on measurement values measured by the measurement methods provided in the JIS and the method disclosed in Non-Patent Literature 1, the degree of freedom of usage of the data is increased, which is convenient.

The present invention has been achieved in view of the above-described circumstances, and an object thereof is to provide a method of identifying a motion error of a machine tool in a coordinate system having its origin at an arbitrary position in the machine tool based on error data measured by a conventional commonly-used measurement method.

Solution to Problem

The present invention, for solving the above-described problems, relates to a method of identifying a relative motion error between a spindle holding a tool and a table for mounting a workpiece thereon in a three-dimensional space in a machine tool, the machine tool including the spindle and the table and including a Z-axis feed mechanism, an X-axis feed mechanism, and a Z-axis feed mechanism respectively corresponding to a Z-axis, an X-axis, and a Y-axis as reference axes, the Z-axis extending along an axis of the spindle, the X-axis and the Y-axis being orthogonal to the Z-axis and orthogonal to each other, the machine tool being configured such that the spindle and the table are moved relative to each other in the three-dimensional space by the X-axis feed mechanism, the Y-axis feed mechanism, and the Z-axis feed mechanism, the method including:

operating the X-axis feed mechanism, the Y-axis feed mechanism, and the Z-axis feed mechanism in a three-dimensional space of a machine coordinate system defined with respect to a machine zero $X_0, Y_0, Z_0$ respectively set for the X-axis feed mechanism, the Y-axis feed mechanism, and the Z-axis feed mechanism, and measuring the following errors with respect to an arbitrary coordinate position in the machine coordinate system:

a positioning error in the X-axis direction;
a positioning error in the Y-axis direction;
a positioning error in the Z-axis direction;
straightness errors in the X-axis, the Y-axis, and the Z-axis;
angular errors around the X-axis, the Y-axis, and the Z-axis in the X-axis;
angular errors around the X-axis, the Y-axis, and the Z-axis in the Y-axis;
angular errors around the X-axis, the Y-axis, and the Z-axis in the Z-axis; and
perpendicularity errors between the X-axis, the Y-axis, and the Z-axis;

deriving, based on the measured actual error data, the following errors in a three-dimensional space of a set coordinate system having its origin at a reference position $X_a, Y_a, Z_a$ preset in the machine coordinate system:

a positioning error in the X-axis direction in the X-axis feed mechanism;
a positioning error in the Y-axis direction in the Y-axis feed mechanism;
a positioning error in the Z-axis direction in the Z-axis feed mechanism;
straightness errors in the X-axis feed mechanism, the Y-axis feed mechanism, and the Z-axis feed mechanism;
angular errors around the X-axis, the Y-axis, and the Z-axis in the X-axis feed mechanism;
angular errors around the X-axis, the Y-axis, and the Z-axis in the Y-axis feed mechanism;
angular errors around the X-axis, the Y-axis, and the Z-axis in the Z-axis feed mechanism; and
perpendicularity errors between the X-axis feed mechanism, the Y-axis feed mechanism, and the Z-axis feed mechanism; and deriving, based on the derived error data, the relative motion error between the spindle and the table in the three-dimensional space of the set coordinate system.

In the present invention, the X-axis feed mechanism, the Y-axis feed mechanism, and the Z-axis feed mechanism are operated in a three-dimensional space of a machine coordinate system defined with respect to a machine zero $X_0, Y_0, Z_0$ respectively set for the X-axis feed mechanism, the Y-axis feed mechanism, and the Z-axis feed mechanism, and a positioning error in the X-axis direction, a positioning error in the Y-axis direction, a positioning error in the Z-axis direction, straightness errors in the X-axis, the Y-axis, and the Z-axis, angular errors around the X-axis, the Y-axis, and the Z-axis in the X-axis, angular errors around the X-axis, the Y-axis, and the Z-axis in the Y-axis, angular errors around the X-axis, the Y-axis, and the Z-axis in the Z-axis, and perpendicularity errors between the X-axis, the Y-axis, and the Z-axis are measured with respect to an arbitrary coordinate position in the machine coordinate system.

The positioning error in the X-axis direction, the positioning error in the Y-axis direction, the positioning error in the Z-axis direction, the straightness errors in the X-axis, the Y-axis, and the Z-axis, the angular errors around the X-axis, the Y-axis, and the Z-axis in the X-axis, the angular errors around the X-axis, the Y-axis, and the Z-axis in the Y-axis, and the angular errors around the X-axis, the Y-axis, and the Z-axis in the Z-axis can be measured, for example, in conformity with the regulations of JIS B 6190-2, JIS B 6336-1, and JIS B 6336-2. The perpendicularity errors between the X-axis, the Y-axis, and the Z-axis can be measured, for example, by means of the double ball bar method disclosed in Non-Patent Literature 1 listed above.

Based on the measured actual error data, a positioning error in the X-axis direction in the X-axis feed mechanism, a positioning error in the Y-axis direction in the Y-axis feed mechanism, a positioning error in the Z-axis direction in the Z-axis feed mechanism, straightness errors in the X-axis feed mechanism, the Y-axis feed mechanism, and the Z-axis feed mechanism, angular errors around the X-axis, the Y-axis, and the Z-axis in the X-axis feed mechanism, angular errors around the X-axis, the Y-axis, and the Z-axis in the Y-axis feed mechanism, angular errors around the X-axis, the Y-axis, and the Z-axis in the Z-axis feed mechanism, and perpendicularity errors between the X-axis feed mechanism, the Y-axis feed mechanism, and the Z-axis feed mechanism in a three-dimensional space of a set coordinate system having its origin at a reference position $X_a, Y_a, Z_a$ preset in the machine coordinate system are derived.

Subsequently, based on the derived error data, a relative motion error between the spindle and the table, i.e., a positioning error of the spindle with respect to the table, in the three-dimensional space of the set coordinate system is derived.

As described above, in the present invention, error data relating to the X-axis feed mechanism, the Y-axis feed mechanism, and the Z-axis feed mechanism in the three-dimensional space of the set coordinate system having its origin at the reference position $X_a, Y_a, Z_a$ preset in the machine coordinate system is derived based on measured actual error data that is measured by an existing commonly-used measurement method, and a motion error of the machine tool in the three-dimensional space of the set coordinate system is derived based on the derived error data. Note that the reference position $X_a$, $Y_a$, $Z_a$ can be set at any positon; for example, it may be set at the machine zero $X_0$, $Y_0$, $Z_0$.

Accordingly, with the present invention, a motion error of a machine tool in a three-dimensional space of a machine coordinate system can be identified based on actual error data that is measured by an existing commonly-used measurement method which does not use an expensive laser length measuring device as mentioned above and which can be carried out more simply in operation than a measurement using such a laser length measuring device. Accordingly, identification of the motion error can be carried out inexpensively and simply in operation.

Further, identifying the motion error in a set coordinate system, the reference position $X_a$, $Y_a$, $Z_a$ of which is set at an arbitrary position, can increase the degree of freedom of usage of the error data.

Note that the error data derived may relate to a spindle center position on a front end of the spindle. With this configuration, a variable element, such as protrusion of a measuring device, in the measurement of the actual errors can be canceled.

Further, the relative motion error between the spindle and the table in the three-dimensional space of the set coordinate system may relate to a tip of a tool to be attached to the spindle. Using a motion error amount obtained with this configuration enables appropriate motion error compensation which is consistent with actual machining using the tool.

Advantageous Effects of Invention

As described above, with the present invention, a motion error of a machine tool in a three-dimensional space of a machine coordinate system can be identified based on measured actual error data that is measured by an existing commonly-used measurement method which does not use an expensive laser length measuring device as mentioned above and which can be carried out more simply in operation than a measurement using such a laser length measuring device. Accordingly, identification of the motion error can be carried out inexpensively and simply in operation.

DESCRIPTION OF EMBODIMENTS

Hereinafter, a specific embodiment of the present invention will be described with reference to the drawings.

Figure 1:
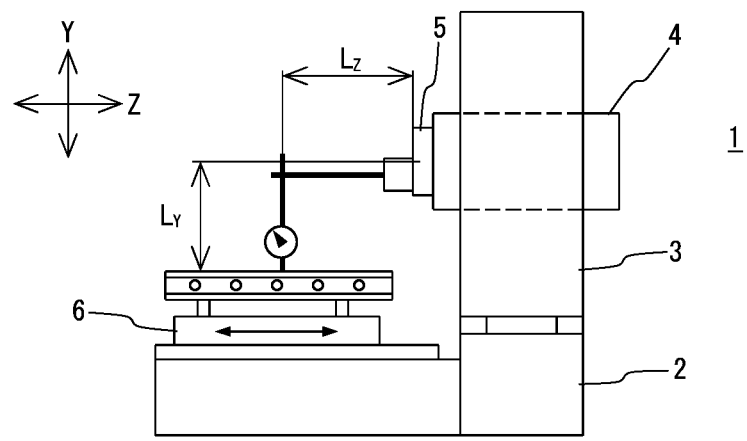
FIG. 1 is an illustration for describing a motion error identification method according to an embodiment of the present invention.
Figure 2:
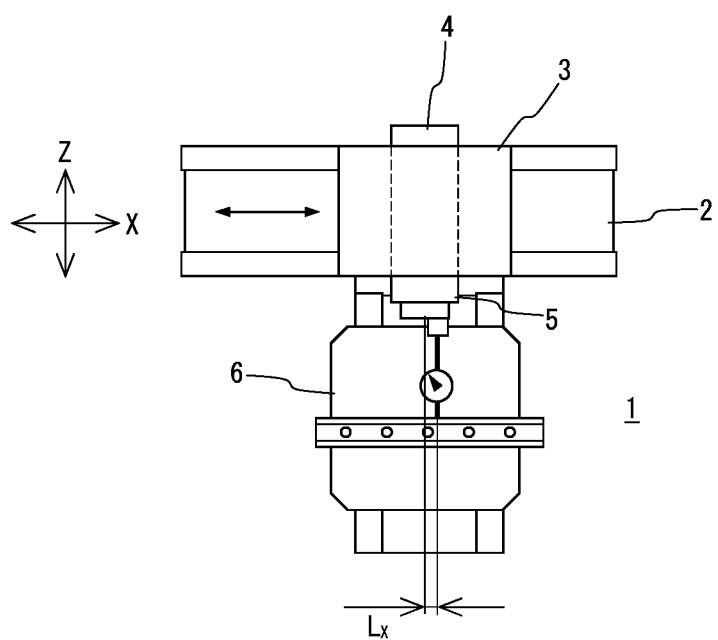
FIG. 2 is an illustration for describing the motion error identification method according to the embodiment.

In this embodiment, a method for identifying a motion error of a horizontal machining center 1 as shown in FIGS. 1 and 2 is described. Note that the machining center 1 includes a bed 2 having a T-shape in plan view, a column 3 disposed on the bed 2 such that it is movable in a direction of an X-axis, a spindle head 4 held by the column 3 such that it is movable in a direction of a Y-axis, a spindle 5 rotatably supported by the spindle head 4, and a table 6 disposed on the bed 2 such that it is movable along a Z-axis.

The column 3 is moved in the X-axis direction by an X-axis feed mechanism (not shown), the spindle head 4 is moved in the Y-axis direction by a Y-axis feed mechanism (not shown), and the table 6 is moved in the Z-axis direction by a Z-axis feed mechanism (not shown). Thus, the X-axis feed mechanism, the Y-axis feed mechanism, and the Z-axis feed mechanism cause the spindle 5 and the table 6 to move relative to each other in a three-dimensional space formed by the three orthogonal axes, i.e., the X-axis, the Y-axis, and the Z-axis.

1. Motion Error Calculation Equations

As for the thus-configured machining center 1, it is known that a motion error (positioning error) of a front-end center position (reference point) of the spindle 5 in a three-dimensional space of a machine coordinate system can be calculated by the equations below. Note that $\alpha$, $\beta$, and $\gamma$ are respectively command values for the X-coordinate, the Y-coordinate, and the Z-coordinate, $E_X(\alpha, \beta, \gamma)$ is a positioning error in the X-axis direction, $E_Y(\alpha, \beta, \gamma)$ is a positioning error in the Y-axis direction, and $E_Z(\alpha, \beta, \gamma)$ is a positioning error in the Z-axis direction.

$$E_X(\alpha,\beta,\gamma)=E_{XX}(\alpha)+E_{XY}(\beta)+E_{XZ}(\gamma)-(E_{CX}(\alpha)+E_{CZ}(\gamma)+C_0Y)\times\beta \quad \text{(Equation 1)}$$

$$E_Y(\alpha,\beta,\gamma)=E_{YX}(\alpha)+E_{YY}(\beta)+E_{YZ}(\gamma)+E_{CZ}(\gamma)\times\alpha \quad \text{(Equation 2)}$$

$$E_Z(\alpha,\beta,\gamma)=E_{ZX}(\alpha)+E_{ZY}(\beta)+E_{ZZ}(\gamma)+(E_{AX}(\alpha)+E_{AZ}(\gamma)+A_0Y)\times\beta-(E_{BZ}(\gamma)+B_0X)\times\alpha \quad \text{(Equation 3)}$$

Note that the error parameters in the above equations are defined as follows:

$E_{XX}$ is a positioning error in the X-axis direction in the X-axis feed mechanism;

$E_{YY}$ is a positioning error in the Y-axis direction in the Y-axis feed mechanism;

$E_{ZZ}$ is a positioning error in the Z-axis direction in the Z-axis feed mechanism;

$E_{YX}$ is a straightness error (in the Y-axis direction) in an X-Y plane in the X-axis feed mechanism;

$E_{ZX}$ is a straightness error (in the Z-axis direction) in an X-Z plane in the X-axis feed mechanism;

$E_{XY}$ is a straightness error (in the X-axis direction) in a Y-X plane in the Y-axis feed mechanism;

$E_{ZY}$ is a straightness error (in the Z-axis direction) in a Y-Z plane in the Y-axis feed mechanism;

$E_{XZ}$ is a straightness error (in the X-axis direction) in a Z-X plane in the Z-axis feed mechanism;

$E_{YZ}$ is a straightness error (in the Y-axis direction) in a Z-Y plane in the Z-axis feed mechanism;

$E_{AX}$ is an angular error around the X-axis in the X-axis feed mechanism;

$E_{AY}$ is an angular error around the X-axis in the Y-axis feed mechanism;

$E_{AZ}$ is an angular error around the X-axis in the Z-axis feed mechanism;

$E_{BX}$ is an angular error around the Y-axis in the X-axis feed mechanism;

$E_{BY}$ is an angular error around the Y-axis in the Y-axis feed mechanism;

$E_{BZ}$ is an angular error around the Y-axis in the Z-axis feed mechanism;

$E_{CX}$ is an angular error around the Z-axis in the X-axis feed mechanism;

$E_{CY}$ is an angular error around the Z-axis in the Y-axis feed mechanism;

$E_{CZ}$ is an angular error around the Z-axis in the Z-axis feed mechanism;

$A_0Y$ is an angular error around the X-axis between the Y-axis feed mechanism and an ideal Y-axis;

$B_0X$ is an angular error around the Y-axis between the X-axis feed mechanism and an ideal X-axis; and $C_0Y$ is an angular error around the Z-axis between the Y-axis feed mechanism and the ideal Y-axis.

Note that other conceivable error parameters are as follows:

an angular error $A_0Z$ around the X-axis between the Z-axis feed mechanism and an ideal Z-axis;

an angular error $B_0Z$ around the Y-axis between the Z-axis feed mechanism and the ideal Z-axis; and an angular error $C_0X$ around the Z-axis between the X-axis feed mechanism and the ideal X-axis.

Further, a positioning error of a tool attached to the spindle 5 can be calculated by the equations below. Note that $T_X$, $T_Y$, $T_Z$ are a deviation in the X-axis direction, a deviation in the Y-axis direction, and a deviation in the Z-axis direction of a tip of the tool with respect to the front-end center position (reference point) of the spindle 5, respectively.

$$E_X(\alpha,\beta,\gamma, T_X, T_Y, T_Z)=E_{XX}(\alpha)+E_{XY}(\beta)+E_{XZ}(\gamma)-(E_{CX}(\alpha)+E_{CZ}(\gamma)+C_0Y)\times\beta+(E_{BX}(\alpha)+E_{BY}(\beta)+E_{BZ}(\gamma))\times T_Z-(E_{CX}(\alpha)+E_{CY}(\beta)+E_{CZ}(\gamma))\times T_Y \quad \text{(Equation 4)}$$

$$E_Y(\alpha,\beta,\gamma, T_X, T_Y, T_Z)=E_{YX}(\alpha)+E_{YY}(\beta)+E_{YZ}(\gamma)+E_{CZ}(\gamma)\times\alpha+(E_{CX}(\alpha)+E_{CY}(\beta)+E_{CZ}(\gamma))\times T_X-(E_{AX}(\alpha)+E_{AY}(\beta)+E_{AZ}(\gamma))\times T_Z \quad \text{(Equation 5)}$$

$$E_Z(\alpha,\beta,\gamma, T_X, T_Y, T_Z)=E_{ZX}(\alpha)+E_{ZY}(\beta)+E_{ZZ}(\gamma)+(E_{AX}(\alpha)+E_{AZ}(\gamma)+A_0Y)\times\beta-(E_{BZ}(\gamma)+B_0X)\times\alpha+(E_{AX}(\alpha)+E_{AY}(\beta)+E_{AZ}(\gamma))\times T_Y-(E_{BX}(\alpha)+E_{BY}(\beta)+E_{BZ}(\gamma))\times T_X \quad \text{(Equation 6)}$$

Further, the equations below can calculate the positioning errors in a set coordinate system having its origin at a position $X_a$, $Y_a$, $Z_a$ that is an arbitrary position in the machine coordinate system.

$$E_X(\alpha,\beta,\gamma)=E_{XX}(\alpha)+E_{XY}(\beta)+E_{XZ}(\gamma)-(E_{CX}(\alpha)+E_{CZ}(\gamma)+C_0Y)\times(\beta-Y_a) \quad \text{(Equation 7)}$$

$$E_Y(\alpha,\beta,\gamma)=E_{YX}(\alpha)+E_{YY}(\beta)+E_{YZ}(\gamma)+(E_{CZ}(\gamma)\times(\alpha-X_a) \quad \text{(Equation 8)}$$

$$E_Z(\alpha,\beta,\gamma)=E_{ZX}(\alpha)+E_{ZY}(\beta)+E_{ZZ}(\gamma)+(E_{AX}(\alpha)+E_{AZ}(\gamma)+A_0Y)\times(\beta-Y_a)-(E_{BZ}(\gamma)+B_0X)\times(\alpha-X_a) \quad \text{(Equation 9)}$$

$$E_X(\alpha,\beta,\gamma, T_X, T_Y, T_Z)=E_{XX}(\alpha)+E_{XY}(\beta)+E_{XZ}(\gamma)-(E_{CX}(\alpha)+E_{CZ}(\gamma)+C_0Y)\times(\beta-Y_a)+$$

$$(E_{BX}(\alpha)+E_{BY}(\beta)+E_{BZ}(\gamma))\times T_Z-(E_{CX}(\alpha)+E_{CY}(\beta)+E_{CZ}(\gamma))\times T_Y \quad \text{(Equation 10)}$$

$$E_Y(\alpha,\beta,\gamma, T_X, T_Y, T_Z)=E_{YX}(\alpha)+E_{YY}(\beta)+E_{YZ}(\gamma)+E_{CZ}(\gamma)\times(\alpha-X_a)+$$

$$(E_{CX}(\alpha)+E_{CY}(\beta)+E_{CZ}(\gamma))\times T_X-(E_{AX}(\alpha)+E_{AY}(\beta)+E_{AZ}(\gamma))\times T_Z \quad \text{(Equation 11)}$$

$$E_Z(\alpha,\beta,\gamma, T_X, T_Y, T_Z)=E_{ZX}(\alpha)+E_{ZY}(\beta)+E_{ZZ}(\gamma)+(E_{AX}(\alpha)+E_{AZ}(\gamma)+A_0Y)\times(\beta-Y_a)-(E_{BZ}(\gamma)+B_0X)\times(\alpha-X_a)+(E_{AX}(\alpha)+E_{AY}(\beta)+E_{AZ}(\gamma))\times T_Y-(E_{BX}(\alpha)+E_{BY}(\beta)+E_{BZ}(\gamma))\times T_X \quad \text{(Equation 12)}$$

2. Motion Error Measurement

In this embodiment, firstly, errors are measured for the items below in conformity with JIS B 6190-2 and JIS B 6336-1. Note that, in the description below, X, Y, and Z representing a position represent the position of the front-end center (reference point) of the spindle 5 in the machine coordinate system, X, Y, and Z representing the position of the reference point with respect to a machine zero in the X-axis feed mechanism, the Y-axis feed mechanism, and the Z-axis feed mechanism, respectively.

[X-Axis]

The X-axis feed mechanism (not shown) is actuated and the reference point is sequentially moved to command positions $X_1$, $X_2$, ... and $X_n$ at predetermined pitch intervals, during which errors $M^{I1}(X_k)$ through $M^{I6}(X_k)$ for the measurement items I1 through $I_6$ below are measured. Note that k is an integer from 1 to n. Note further that command positions in the Y-axis feed mechanism (not shown) and Z-axis feed mechanism (not shown) during measurement of each measurement item are respectively arbitrary positions $Y^{Im}$ and $Z^{Im}$, m corresponding to the suffix of the measurement item.

$I_1$: an X-axis positioning error $M^{I1}(X_k)$ is measured (JIS B 6190-2)

$I_2$: an X-axis straightness error $M^{I2}(X_k)$ is measured (in the Y-axis direction) (JIS B 6336-1)

$I_3$: an X-axis straightness error $M^{I3}(X_k)$ is measured (in the Z-axis direction) (JIS B 6336-1)

$I_4$: an X-axis angular error $M^{I4}(X_k)$ is measured (around the X-axis) (JIS B 6336-1)

$I_5$: an X-axis angular error $M^{I5}(X_k)$ is measured (around the Y-axis) (JIS B 6336-1)

$I_6$: an X-axis angular error $M^{I6}(X_k)$ is measured (around the Z-axis) (JIS B 6336-1)

[Y-Axis]

The Y-axis feed mechanism (not shown) is actuated and the reference point is subsequently moved to command positions $Y_1$, $Y_2$, ... and $Y_n$ at predetermined pitch intervals, during which errors $M^{I7}(Y_k)$ through $M^{I12}(Y_k)$ for the measurement items $I_7$ through $I_{12}$ below are measured. Note that k is an integer from 1 to n. Note further that command positions in the X-axis feed mechanism (not shown) and the Z-axis feed mechanism (not shown) during measurement of each measurement item are respectively arbitrary positions $X^{Im}$ and $Z^{Im}$, m corresponding to the suffix of the measurement item.

$I_7$: a Y-axis positioning error $M^{I7}(Y_k)$ is measured (JIS B 6190-2)

$I_8$: a Y-axis straightness error $M^{I8}(Y_k)$ is measured (in the X-axis direction) (JIS B 6336-1)

$I_9$: a Y-axis straightness error $M^{I9}(Y_k)$ is measured (in the Z-axis direction) (JIS B 6336-1)

$I_{10}$: a Y-axis angular error $M^{I10}(Y_k)$ is measured (around the X-axis) (JIS B 6336-1)

$I_{11}$: a Y-axis angular error $M^{I11}(Y_k)$ is measured (around the Y-axis) (JIS B 6336-1)

$I_{12}$: a Y-axis angular error $M^{I12}(Y_k)$ is measured (around the Z-axis) (JIS B 6336-1)

[Z-Axis]

The Z-axis feed mechanism (not shown) is actuated and the reference point is sequentially moved to command positions $Z_1$, $Z_2$, ... and $Z_n$ at predetermined pitch intervals, during which errors $M^{I13}(Z_k)$ through $M^{I18}(Z_k)$ for the measurement items I13 through $I_{18}$ below are measured. Note that k is an integer from 1 to n. Note further that command positions in the X-axis feed mechanism (not shown) and the Y-axis feed mechanism (not shown) during measurement of each measurement item are respectively arbitrary positions $X^{Im}$ and $Y^{Im}$, m corresponding to the suffix of the measurement item.

$I_{13}$: a Z-axis positioning error $M^{I13}(Z_k)$ is measured (JIS B 6190-2);

$I_{14}$: a Z-axis straightness error $M^{I14}(Z_k)$ is measured (in the X-axis direction) (JIS B 6336-1);

$I_{15}$: a Z-axis straightness error $M^{I15}(Z_k)$ is measured (in the Y-axis direction) (JIS B 6336-1);

$I_{16}$: a Z-axis angular error $M^{I16}(Z_k)$ is measured (around the X-axis) (JIS B 6336-1);

$I_{17}$: a Z-axis angular error $M^{I17}(Z_k)$ is measured (around the Y-axis) (JIS B 6336-1); and $I_{18}$: a Z-axis angular error $M^{I18}(Z_k)$ is measured (around the Z-axis) (JIS B 6336-1).

[Perpendicularity]

Measurement is performed with a double ball bar In accordance with Non-Patent Literature 1, wherein the center position of the table-side ball is set at an arbitrary position $X_i$, $Y_i$, $Z_i$, the reference point of the spindle 5 is circularly moved with the length of the bar as a rotation radius in an X-Y plane, in an X-Z plane, and in a Y-Z plane, and lengths $M_{Aij}$ (in the Y-Z plane), $M_{Bij}$ (in the X-Z plane), and $M_{Cij}$ (in the X-Y plane) of the bar are measured based on the amount of expansion/contraction of the bar. $M_{Aij}$ is a length of the bar at a position $Y_{Aij}$, $Z_{Aij}$ in the circular movement of the reference point of the spindle 5 in the Y-Z plane that is defined with $X_i$ fixed, $M_{Bij}$ is a length of the bar at a position $X_{Bij}$, $Z_{Bij}$ in the circular movement of the reference point of the spindle 5 in the X-Z plane that is defined with $Y_i$ fixed, and $M_{Cij}$ is a length of the bar at a position $X_{Cij}$, $Y_{Cij}$ in the circular movement of the reference point of the spindle 5 in the X-Y plane that is defined with $Z_i$ fixed. Note that i is an integer from 1 to g and means the number of times of perpendicularity measurement, and j is an integer from 1 to h and means a sampling number of the position of the spindle 5.

Figure 3:
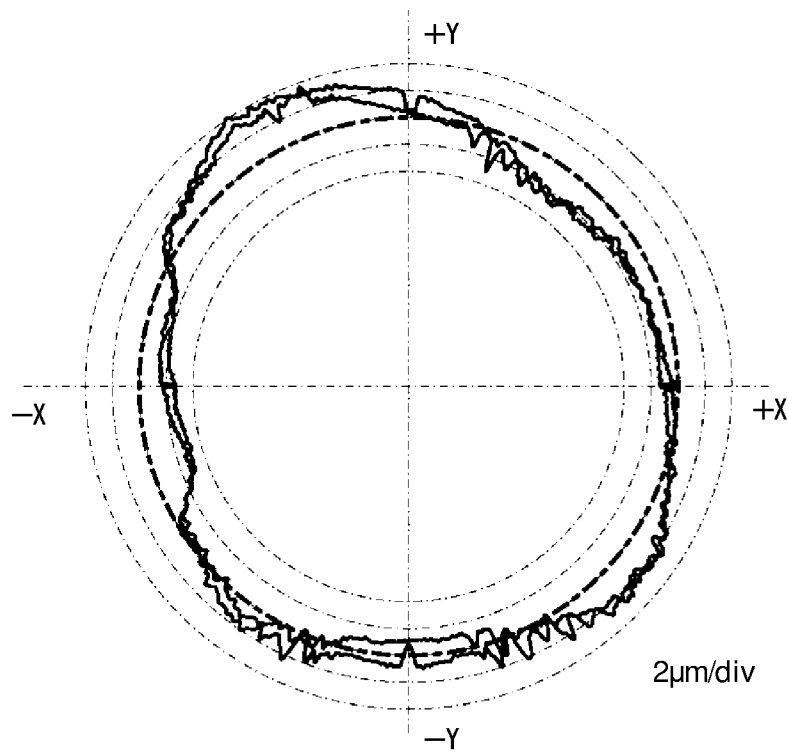
FIG. 3 is an illustration showing results of measurement of a perpendicularity between an X-axis feed mechanism and a Y-axis feed mechanism in an X-Y plane using a double ball bar.
Figure 4:
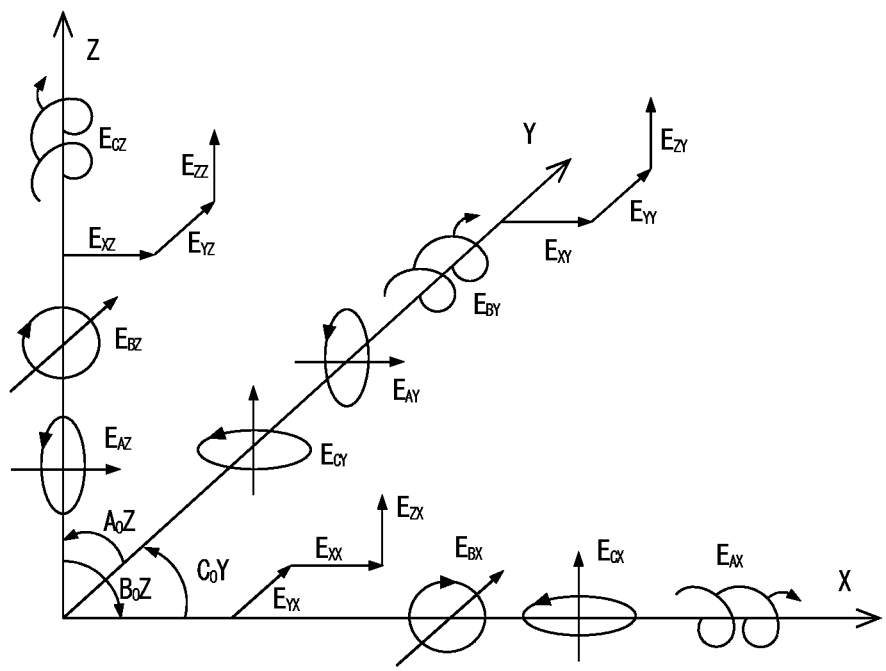
FIG. 4 is an illustration showing error parameters causing a motion error.
Figure 5:
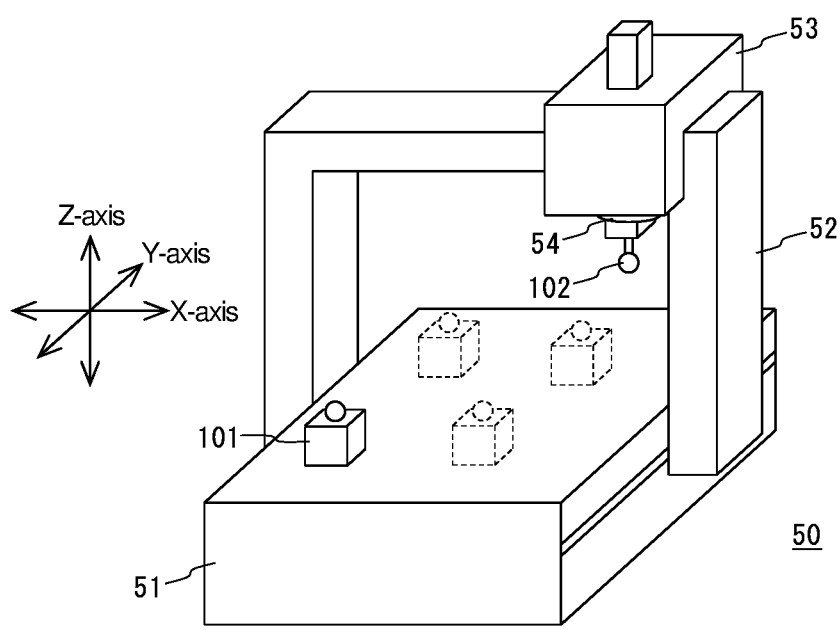
FIG. 5 is an illustration for describing a conventional method for identifying a motion error.

FIG. 3 shows an example of measurement data (amount of expansion/contraction of the bar) obtained by measuring the perpendicularity between the X-axis feed mechanism and the Y-axis feed mechanism in the X-Y plane with a double ball bar. In FIG. 3, one of the two solid line depictions represents measurement data for normal rotation of the reference point of the spindle 5, and the other represents measurement data for reverse rotation of the reference point of the spindle 5. Further, the bold dotted-and-dashed line circle represents a reference circle and the thin dotted-and-dashed line circles represent graduations.

Based on the obtained measurement values $M_{Aij}$, $M_{Bij}$ and $M_{Cij}$, perpendicularities $P_{Ai}$, $P_{Bi}$, and $P_{Ci}$ and perpendicularity errors $A_0Y_i$, $B_0X_i$, and $C_0Y_i$ for the X-axis feed mechanism, the Y-axis feed mechanism, and the Z-axis feed mechanism when the center position of the table-side ball is positioned at theposition $X_i$, $Y_i$, $Z_i$ are calculated in accordance with Non-Patent Literature 1.

Note that:

$P_{Ai}$ is a perpendicularity between the Y-axis feed mechanism and the ideal Z-axis;

$P_{Bi}$ is a perpendicularity between the X-axis feed mechanism and the ideal Z-axis;

$P_{Ci}$ is a perpendicularity between the Y-axis feed mechanism and the ideal X-axis;

$A_0Y_i$ is an angular error around the X-axis between the Y-axis feed mechanism and the ideal Y-axis;

$B_0X_i$ is an angular error around the Y-axis between the X-axis feed mechanism and the ideal X-axis; and $C_0Y_i$ is an angular error around the Z-axis between the Y-axis feed mechanism and the ideal Y-axis.

Note that the perpendicularities $P_{Ai}$, $P_{Bi}$, and $P_{Ci}$ are respectively represented as functions of the measurement values $M_{Aij}$, $M_{Bij}$, and Mg as follows:

$f_A(M_{Ai}) = P_{Ai}$;

$f_B(M_{Bi}) = P_{Bi}$; and $f_C(M_{Ci}) = P_{Ci}$, where $M_{Ai}$ is total data of the measurement value $M_{Aij}$ from j=1 through j=h, $M_{Bi}$ is total data of the measurement value $M_{Bij}$ from j=1 through j=h, and $M_{Ci}$ is total data of the measurement value $M_{Cij}$ from j=1 through j=h.

3. Identification of Error Parameters the X-Axis Feed Mechanism, Y-Zxis Feed Mechanism, and Z-Axis Feed Mechanism Subsequently, the above-mentioned error parameters $E_{XX}$, $E_{YY}$, $E_{ZZ}$, $E_{YX}$, $E_{ZX}$, $E_{XY}$, $E_{ZY}$, $E_{XZ}$, $E_{YZ}$, $E_{AX}$, $E_{AY}$, $E_{AZ}$, $E_{BX}$, $E_{BY}$, $E_{BZ}$, $E_{CX}$, $E_{CY}$, and $E_{CZ}$ in the X-axis feed mechanism, the Y-axis feed mechanism, and the Z-axis feed mechanism are identified based on the error data $M^{I1}(X_k)$ through $M^{I6}(X_k)$, $M^{I7}(Y_k)$ through $M^{I12}(Y_k)$, and $M^{I13}(Z_k)$ through $M^{I18}(Z_k)$ measured in the above-described manner.

By way of example, the X-axis straightness error $M^{I3}(X_k)$ (in the Z-axis direction) is examined. As shown in FIGS. 1 and 2, the straightness error $M^{I3}(X_k)$ is measured with an indicator (e.g., a dial gauge) protruding from the command positions in the X-axis, the Y-axis, and the Z-axis; therefore, the protrusion is regarded as an error factor. Since the command values $Y^{I3}$ and $Z^{I3}$ in the Y-axis and the Z-axis, which are other than the X-axis as the measurement target, as well as protrusion amounts $L^{I3}_X, L^{I3}_Y$, and $L^{I3}_Z$ of the indicator in the three directions are fixed, the straightness error $M^{I3}(X_k)$ can be represented by the following equation:

$$M^{I3}(X_k) = E_Z(X_k, Y^{I3}, Z^{I3}, L^{I3}_X, L^{I3}_Y, L^{I3}_Z) + \text{Const}^{I3}.$$

Note that $\text{Const}^{I3}$ is a constant term.

When $E_Z(X_k, Y^{I3}, Z^{I3}, L_X, L_Y, L_Z)$ in the above equation is expanded as an error in the set coordinate system having its origin at the position $X_a$, $Y_a$, $Z_a$ that is an arbitrary position in the machine coordinate system, the equation below is obtained according to Equation 12.

$$M^{I3}(X_k) = E_{ZX}(X_k) + E_{ZY}(Y^{I3}) + E_{ZZ}(Z^{I3}) + (E_{AX}(X_k) + E_{AZ}(Z^{I3}) + A_0Y) \times (Y^{I3} - Y_a) - (E_{BZ}(Z^{I3}) + B_0X) \times (X_k - X_a) + (E_{AX}(X_k) + E_{AY}(Y^{I3}) + E_{AZ}(Z^{I3})) \times L^{I3}_Y - (E_{BX}(X_k) + E_{BY}(Y^{I3}) + E_{BZ}(Z^{I3})) \times L^{I3}_X + \text{Const}^{I3}$$

Further, when the constant terms are consolidated into $\text{Const}^{I3}$, the equation below is obtained.

$$M^{I3}(X_k) = E_{ZX}(X_k) + E_{AX}(X_k) \times (Y^{I3} - Y_a) + (E_{BZ}(Z^{I3}) + B_0X) \times X_k + E_{AX}(X_k) \times L^{I3}_Y - E_{BX}(X_k) \times L^{I3}_X + \text{Const}^{I3}$$

Furthermore, when $E'_{ZX}(X_k) = E_{ZX}(X_k) + (E_{BZ}(Z^{I3}) + B_0X) \times X_k$ is intoruced, the equation below is obtained.

$$M^{I3}(X_k) = E'_{ZX}(X_k) + E_{AX}(X_k) \times (Y^{I3} - Y_a) + E_{AX}(X_k) \times L^{I3}_Y - E_{BX}(X_k) \times L^{I3}_X + \text{Const}^{I3}$$

Since $E'_{ZX}(X_k)$ can be considered to be equivalent to $E_{ZX}(X_k)$, the equation below is obtained eventually.

$$M^{I3}(X_k) = E_{ZX}(X_k) + E_{AX}(X_k) \times (Y^{I3} - Y_a) + E_{AX}(X_k) \times L^{I3}_Y - E_{BX}(X_k) \times L^{I3}_X + \text{Const}^{I3}$$

Thus, the X-axis straightness error $M^{I3}(X_k)$ can be represented by an equation which does not use the perpendicularity ($B_0X$) in the X-axis feed mechanism and the perpendicularity ($A_0Y$) in the Y-axis feed mechanism.

Further, the X-axis angular error $M^{I6}(X_k)$ around the Z-axis is examined. Since the angular errors involve no other error factors, the angular error $M_{I6}(X_k)$ can be represented by the following equation:

$$M^{I6}(X_k) = E_{CX}(X_k) + \text{Const}^{I6}.$$

Note that $\text{Const}^{I6}$ is a constant term.

On the basis of the above examination, the above-mentioned errors can be represented by equations which do not use the perpendicularity ($B_0X$) in the X-axis feed mechanism, the perpendicularity ($A_0Y$) in the Y-axis feed mechanism, and the perpendicularity ($C_0Y$) in the Z-axis feed mechanism as follows:

$$M^{I1}(X_k)=E_{XX}(X_k)-E_{CX}(X_k)\times(Y^{I1}-Y_a)+E_{BX}(X_k)\times L^{I1}{}_Z-E_{CX}(X_k)\times L^{I1}{}_Y+Const^{I1};$$

$$M^{I2}(X_k)=E_{YX}(X_k)+E_{CX}(X_k)\times L^{I2}{}_X-E_{AX}(X_k)\times L^{I2}{}_Z+Const^{I2};$$

$$M^{I3}(X_k)=E_{ZX}(X_k)+E_{AX}(X_k)\times(Y^{I3}-Y_a)+E_{AX}(X_k)\times L^{I3}{}_Y-E_{BX}(X_k)\times L^{I3}{}_X+Const^{I3};$$

$$M^{I4}(X_k)=E_{AX}(X_k)+Const^{I4};$$

$$M^{I5}(X_k)=E_{BX}(X_k)+Const^{I5};$$

$$M^{I6}(X_k)=E_{CX}(X_k)+Const^{I6};$$

$$M^{I7}(Y_k)=E_{YY}(Y_k)+E_{CY}(Y_k)\times L^{I7}{}_X-E_{AY}(Y_k)\times L^{I7}{}_Z+Const^{I7};$$

$$M^{I8}(Y_k)=E_{XY}(Y_k)+E_{BY}(Y_k)\times L^{I8}{}_X-E_{AY}(Y_k)\times L^{I8}{}_Z+Const^{I8};$$

$$M^{I9}(Y_k)=E_{ZY}(Y_k)+E_{AY}(Y_k)\times L^{I9}{}_X-E_{AY}(Y_k)\times L^{I9}{}_Z+Const^{I9};$$

$$M^{I10}(Y_k)=E_{AY}(Y_k)+Const^{I10};$$

$$M^{I11}(Y_k)=E_{BY}(Y_k)+Const^{I11};$$

$$M^{I12}(Y_k)=E_{CY}(Y_k)+Const^{I12};$$

$$M^{I13}(Z_k)=E_{ZZ}(Z_k)+E_{AZ}(Z_k)\times(Y^{I13}-Y_a)-E_{BZ}(Z_k)\times(X^{I13}-X_a)^I+E_{AZ}(Z_k)\times L^{I13}{}_Y-E_{BZ}(Z_k)\times L^{I13}{}_X+Const^{I3};$$

$$M^{I14}(Z_k)=E_{XZ}(Z_k)-E_{CZ}(Z_k)\times(Y^{I14}-Y_a)+E_{BZ}(Z_k)\times L^{I14}{}_Z-E_{CZ}(Z_k)\times L^{I14}{}_Y+Const^{I2},$$

$$M^{I15}(Z_k)=E_{YZ}(Z_k)+E_{CZ}(Z_k)\times(X^{I13}-X_a)+E_{CZ}(Z_k)\times L^{I15}{}_X-E_{AZ}(Z_k)\times L^{I15}{}_Z+Const^{I15},$$

$$M^{I16}(Z_k)=E_{AZ}(Z_k)+Const^{I16};$$

$$M^{I17}(Z_k)=E_{BY}(Z_k)+Const^{I17};\text{ and}$$

$$M^{I18}(Z_k)=E_{CY}(Z_k)+Const^{I18}.$$

Based on these equations, the error parameters are as follows:

$$E_{XX}(X_k)=M^{I1}(X_k)+E_{CX}(X_k)\times(Y^{I1}-Y_a)-E_{BX}(X_k)\times L^{I1}{}_Z+E_{CX}(X_k)\times L^{I1}{}_Y-Const^{I1};$$

$$E_{YX}(X_k)=M^{I2}(X_k)-E_{CX}(X_k)\times L^{I2}{}_X+E_{AX}(X_k)\times L^{I2}{}_Z-Const^{I2};$$

$$E_{ZX}(X_k)=M^{I3}(X_k)-E_{AX}(X_k)\times(Y^{I3}-Y_a)-E_{AX}(X_k)\times L^{I3}{}_Y+E_{BX}(X_k)\times L^{I3}{}_X-Const^{I3};$$

$$E_{AX}(X_k)=M^{I4}(X_k)-Const^{I4};$$

$$E_{BX}(X_k)=M^{I5}(X_k)-Const^{I5};$$

$$E_{CX}(X_k)=M^{I6}(X_k)-Const^{I6};$$

$$E_{YY}(Y_k)=M^{I7}(Y_k)-E_{CY}(Y_k)\times L^{I7}{}_X+E_{AY}(Y_k)\times L^{I7}{}_Z+Const^{I7};$$

$$E_{XY}(Y_k)=M^{I8}(Y_k)-E_{BY}(Y_k)\times L^{I8}{}_X+E_{CY}(Y_k)\times L^{I8}{}_Y+Const^{I8};$$

$$E_{ZY}(Y_k)=M^{I9}(Y_k)-E_{AY}(Y_k)\times L^{I9}{}_Y+E_{BY}(Y_k)\times L^{I9}{}_X+Const^{I9};$$

$$E_{AY}(Y_k)=M^{I10}(Y_k)-Const^{I10};$$

$$E_{BY}(Y_k)=M^{I11}(Y_k)-Const^{I11};$$

$$E_{CY}(Y_k)=M^{I12}(Y_k)-Const^{I12};$$

$$E_{ZZ}(Z_k)=M^{I13}(Z_k)-E_{AZ}(Z_k)\times(Y^{I13}-Y_a)+E_{BZ}(Z_k)\times(X^{I13}-X_a)^I-E_{AZ}(Z_k)\times L^{I13}{}_Y+E_{BZ}(Z_k)\times L^{I13}{}_X-Const^{I13};$$

$$E_{XZ}(Z_k)=M^{I14}(Z_k)+E_{CZ}(Z_k)\times(Y^{I14}-Y_a)-E_{BZ}(Z_k)\times L^{I14}{}_Z+E_{CZ}(Z_k)\times L^{I14}{}_Y-Const^{I2};$$

$$E_{YZ}(Z_k)=M^{I15}(Z_k)-E_{CZ}(Z_k)\times(X^{I15}-X_a)-E_{CZ}(Z_k)\times L^{I15}{}_X+E_{AZ}(Z_k)\times L^{I15}{}_Z-Const^{I15};$$

$$E_{AZ}(Z_k)=M^{I16}(Z_k)-Const^{I16};$$

$$E_{BY}(Z_k)=M^{I17}(Z_k)-Const^{I17};\text{ and}$$

$$E_{CY}(Z_k)=M^{I18}(Z_k)-Const^{I18}.$$

Thus, the error parameters in the set coordinate system having its origin at the position $X_a$, $Y_a$, $Z_a$ that is an arbitrary position in the machine coordinate system can be identified by the above equations. Note that the constant terms $Const^{I1}$ through $Const^{I18}$ can be each considered as the degree of freedom for changing setting of the zero point for the respective error.

4. Identification of Perpendicularity Error Parameters

Subsequently, based on the perpendicularity measurement values $M_{Aij}$, $M_{Bij}$, and $M_{Cij}$ measured in the above-described manner, the perpendicularities $P_{Ai}$, $P_{Bi}$, and $P_{Ci}$ which are calculated below, and the perpendicularity errors $A_0Y_i$, $B_0X_i$, and $C_0Y_i$, the perpendicularity errors $A_0Y$, $B_0X$, and $C_0Y$ in the set coordinate system having its origin at the position $X_a$, $Y_a$, $Z_a$ that is an arbitrary position in the machine coordinate system are identified.

Prior to identification of the perpendicularity errors $A_0Y$, $B_0X$, and $C_0Y$, the calculation basis for the identification is described. As described above, the perpendicularities $P_{Ai}$, $P_{Bi}$, and $P_{Ci}$ are respectively represented as functions of the measurement values $M_{Aij}$, $M_{Bij}$, and $M_{Cij}$ as follows:

$$f_A(R_{Aij})=P_{Ai}; \quad \text{(Equation 13)}$$

$$f_B(R_{Bij})=P_{Bi};\text{ and} \quad \text{(Equation 14)}$$

$$f_C(R_{Cij})=P_{Ci}, \quad \text{(Equation 15)}$$

where $M_{Ai}$ is total data of the measurement value $M_{Aij}$, $M_{Bij}$ is total data of the measurement value $M_{Bij}$, and $M_{Ci}$ is total data of the measurement value $M_{Cij}$.

On the other hand, when the spindle 5 is circularly moved with a double ball bar, the positioning errors of the spindle 5 with respect to the command values in the set coordinate system having its origin at the position $X_a$, $Y_a$, $Z_a$ that is an arbitrary position in the machine coordinate system can be calculated by Equations 10 to 12 above. Therefore, where the position of the table-side sphere in the machine coordinate system is represented by $X_i$, $Y_i$, $Z_i$ and the position of the reference point of the spindle 5 circularly moved in the X-Y plane with respect to the position $X_i$, $Y_i$, $Z_i$ is represented by $X_{ik}$, $Y_{ik}$, $Z_i$, the length $S_{Cik}$ of the bar can be calculated by the following equation:

$$S_{Cik}=((X_{ik}+E_{Xik}-X_i)^2+(Y_{ik}+E_{Yik}-Y_i)^2+(Z_i+E_{Zik}-Z_i)^2)^{1/2}. \quad \text{(Equation 16)}$$

Note that $E_{Xik}$, $E_{Yik}$, and $E_{Zik}$ are the positioning errors of the spindle 5 calculated by Equations 10 to 12 above. The calculation of the positioning errors of the spindle 5 is carried out with $C_0Y$ in Equation 10 and $A_0Y$ and $B_0X$ in Equation 12 being respectively replaced by arbitrary values $C_0Y'$, $A_0Y'$ and $B_0X'$ that are temporary values.

$E_{Xik} = E_X(X_{ik}, Y_{ik}, Z_i, t_X, t_Y, t_Z)$
$E_{Yik} = E_Y(X_{ik}, Y_{ik}, Z_i, t_X, t_Y, t_Z)$
$E_{Zik} = E_Z(X_{ik}, Y_{ik}, Z_i, t_X, t_Y, t_Z)$

Note that $t_X$, $t_Y$, and $t_Z$ are distances of deviation of the spindle-side sphere from the reference point of the spindle 5 in the X-axis direction, the Y-axis direction, and the Z-axis direction, respectively.

In Equation 16 above, $E_{Xik}$, $E_{Yik}$, and $E_{Zik}$ are infinitesimal values; therefore, where the squared terms thereof are approximated by zero, $S_{cik}$ can be represented by the following equation:

$$S_{Cik} = ((X_{ik} - X_i)^2 + (Y_{ik} - Y_i)^2 + 2E_{Xik}(X_{ik} - X_i) + 2E_{Yik}(Y_{ik} - Y_i))^{1/2}. \quad \text{(Equation 17)}$$

Further, where total data of the length $S_{Cik}$ of the bar calculated is represented by $S_{Ci}$, a perpendicularity $P'_{Ci}$ calculated from $S_{Ci}$ can be represented by the following relational equation:

$$f(S_{Ci}) = P'_{Ci}. \quad \text{(Equation 18)}$$

Here, if the temporary perpendicularity error $C_0Y'$ is equal to the true perpendicularity error $C_0Y$ in the set coordinate system having its origin at the position $X_a$, $Y_a$, $Z_a$ that is an arbitrary position in the machine coordinate system, the following relational equation holds:

$C_0Y - P_{Ci} = C_0Y' - P'_{Ci}.$

When this equation is transformed, the equation below is obtained.

$$C_0Y = C_0Y' - P'_{Ci} + P_{Ci}. \quad \text{(Equation 19)}$$

Accordingly, by using Equation 19 above, the true perpendicularity error $C_0Y$ in the set coordinate system having its origin at the position $X_a$, $Y_a$, $Z_a$ that is an arbitrary position in the machine coordinate system can be identified based on the temporary perpendicularity error $C_0Y'$, the perpendicularity $P_{Ci}$ calculated by Equation 15, and the perpendicularity $P'_{Ci}$ calculated by Equation 18.

Similarly, as for the perpendicularity error $B_0X$, where the reference point of the spindle 5 circularly moved in the X-Z plane is represented by $X_{ik}$, $Y_i$, $Z_{ik}$, the length $S_{Bik}$ of the bar is as follows:

$$S_{Bik} = ((X_{ik} + E_{Xik} - X_i)^2 + (Y_i + E_{Yik} - Y_i)^2 + (Z_{ik} + E_{Zik} - Z_i)^2)^{1/2}.$$

Where the squared terms of $E_{Xik}$, $E_{Yik}$, and $E_{Zik}$ that are infinitesimal values are approximated by zero, $S_{Bik}$ is as follows:

$$S_{Bik} = ((X_{ik} - X_i)^2 + (Z_{ik} - Z_i)^2 + 2E_{Xik}(X_{ik} - X_i) + 2E_{Zik}(Z_{ik} - Z_i))^{1/2}. \quad \text{(Equation 20)}$$

Where total data of the length $S_{Bik}$ of the bar calculated is represented by $S_{Bi}$, a perpendicularity $P'_{Bi}$ calculated from $S_{Bi}$ can be represented by the following relational equation:

$$f(S_{Bi}) = P'_{Bi}. \quad \text{(Equation 21)}$$

Accordingly, the true perpendicularity error $B_0X$ in the coordinate system having it origin at the position $X_a$, $Y_a$, $Z_a$ that is an arbitrary position in the machine coordinate system can be identified by Equation 22 below based on the temporary perpendicularity error $B_0X'$, the perpendicularity $P_{Bi}$ calculated by Equation 14 above, and the perpendicularity $P'_{Bi}$ calculated by Equation 21 above.

$$B_0X = B_0X' - P'_{Bi} + P_{Bi} \quad \text{(Equation 22)}$$

Further, as for the perpendicularity error $A_0Y$, where the position of the spindle 5 circularly moved in the Y-Z plane is represented by $X_i$, $Y_{ik}$, $Z_{ik}$, the length $S_{Aik}$ of the bar is as follows:

$$S_{Aik} = ((X_i + E_{Xik} - X_i)^2 + (Y_{ik} + E_{Yik} - Y_i)^2 + (Z_{ik} + E_{Zik} - Z_i)^2)^{1/2}.$$

Where the squared terms of $E_{Xik}$, $E_{Yik}$, and $E_{Zik}$ that are infinitesimal values are approximated by zero, $S_{Aik}$ is as follows:

$$S_{Aik} = ((Y_{ik} - Y_i)^2 + (Z_{ik} - Z_i)^2 + 2E_{Yik}(Y_{ik} - Y_i) + 2E_{Zik}(Z_{ik} - Z_i))^{1/2}. \quad \text{(Equation 23)}$$

Where total data of the length $S_{Aik}$ of the bar calculated is represented by $S_{Ai}$, a perpendicularity $P'_{Ai}$ calculated from $S_{Ai}$ can be represented by the following relational equation:

$$f(S_{Ai}) = P'_{Ai}. \quad \text{(Equation 24)}$$

Accordingly, the true perpendicularity error $A_0Y$ in the coordinate system having it origin at the position $X_a$, $Y_a$, $Z_a$ that is an arbitrary position in the machine coordinate system can be identified by Equation 25 below based on the temporary perpendicularity error $A_0Y'$, the perpendicularity $P_{Ai}$ calculated by Equation 13 above, and the perpendicularity $P'_{Ai}$ calculated by Equation 24 above.

$$A_0Y = A_0Y' - P'_{Ai} + P_{Ai}. \quad \text{(Equation 25)}$$

In the above-described manner, the perpendicularly errors $A_0Y$, $B_0X$, and $C_0Y$ in the set coordinate system having its origin at the position $X_a$, $Y_a$, $Z_a$ that is an arbitrary position in the machine coordinate system are identified. Note that, in the case where the perpendicularity errors $A_0Y$, $B_0X$, and $C_0Y$ in the machine coordinate system defined with respect to the machine zero are identified, the perpendicularity errors $A_0Y$, $B_0X$, and $C_0Y$ are identified with values of $E_{Xik}$, $E_{Yik}$, and $E_{Zik}$ which are calculated under the conditions: $X_a = 0$, $Y_a = 0$, and $Z_a = 0$.

5. Identification of Motion Error

Based on the error parameters identified in the above-described manners, the positioning errors $E_X(\alpha, \beta, \gamma)$, $E_Y(\alpha, \beta, \gamma)$, and $E_Z(\alpha, \beta, \gamma)$ of the reference point of the spindle 5 in the three-dimensional space of the machine coordinate system are identified by Equations 1 to 3 above, and the positioning errors $E_X(\alpha, \beta, \gamma, T_X, T_Y, T_Z)$, $E_Y(\alpha, \beta, \gamma, T_X, T_Y, T_Z)$, and $E_Z(\alpha, \beta, \gamma, T_X, T_Y, T_Z)$ of the tip of the tool attached to the spindle 5 in the three-dimensional space of the machine coordinate system are identified by Equations 4 to 6 above.

Further, the positioning errors $E_X(\alpha, \beta, \gamma)$, $E_Y(\alpha, \beta, \gamma)$, and $E_Z(\alpha, \beta, \gamma)$ of the reference point of the spindle 5 in the set coordinate system having its origin at the poaition $X_a$, $Y_a$, $Z_a$ that is an arbitrary position in the machine coordinate system are identified by Equations 7 to 9 above, and the positioning errors $E_X(\alpha, \beta, \gamma, T_X, T_Y, T_Z)$, $E_Y(\alpha, \beta, \gamma, T_X, T_Y, T_Z)$, and $E_Z(\alpha, \beta, \gamma, T_X, T_Y, T_Z)$ of the tip of the tool attached to the spindle 5 in the set coordinate system having its origin at the position $X_a$, $Y_a$, $Z_a$ that is an arbitrary position in the machine coordinate system are identified by Equations 10 to 12 above.

Thus, in this embodiment, the motion error (positioning errors) $E_X(\alpha, \beta, \gamma)$, $E_Y(\alpha, \beta, \gamma)$, $E_Z(\alpha, \beta, \gamma)$ of the reference point of the spindle 5 and the positioning errors $E_X(\alpha, \beta, \gamma, T_X, T_Y, T_Z)$, $E_Y(\alpha, \beta, \gamma, T_X, T_Y, T_Z)$, and $E_Z(\alpha, \beta, \gamma, T_X, T_Y, T_Z)$ of the tool tip in the set coordinate system having its origin at the position $X_a$, $Y_a$, $Z_a$ that is an arbitrary position in the machine coordinate system can be calculated in the above-described manner. Further, the motion error $E_X(\alpha,\beta,\gamma)$, $E_Y(\alpha,\beta,\gamma)$, $E_Z(\alpha,\beta,\gamma)$ and errors $E_X(\alpha,\beta,\gamma, T_X, T_Y, T_Z)$, $E_Y(\alpha,\beta,\gamma, T_X, T_Y, T_Z)$, and $E_Z(\alpha,\beta,\gamma, T_X, T_Y, T_Z)$ in the machine coordinate system can be calculated by using the conditions: $X_a=0$, $Y_a=0$, and $Z_a=0$.

As described above, in this embodiment, the motion errors of the reference point and the motion errors of the tool tip in the three-dimensional space of the machine coordinate system and in the three-dimensional space of the set coordinate system having its origin at the arbitrary reference position $X_a$, $Y_a$, $Z_a$ can be identified based on actual error data that is measured by means of the commonly-used measurement methods complying with the regulations of JIS. Therefore, identification of the motion errors can be carried out inexpensively and simply in operation.

Further, since the motion errors in the set coordinate system having its origin at the arbitrary reference position $X_a$, $Y_a$, $Z_a$ can be identified, the degree of freedom of usage of the error data is increased.

Hereinbefore, one embodiment of the present invention has been described. However, the present invention is not limited thereto and can be implemented in other modes.

For example, the measurement of the errors in the above embodiment complies with the regulations of JIS; however, the errors may be measured by means of any other method which is able to measure the errors as accurately and easily as or more accurately and easily than the regulations of JIS.

The equations above for calculating the error parameters $E_{XX}$, $E_{YY}$, $E_{ZZ}$, $E_{YX}$, $E_{ZX}$, $E_{XY}$, $E_{ZY}$, $E_{XZ}$, $E_{YZ}$, $E_{AX}$, $E_{AY}$, $E_{AZ}$, $E_{BX}$, $E_{BY}$, $E_{BZ}$, $E_{CX}$, $E_{CY}$, and $E_{CZ}$ are shown by way of example only; the present invention is not limited thereto and these error parameters may be calculated by other equations. The identification of the perpendicularity errors $A_0Y$, $B_0X$, and $C_0Y$ is not limited to the above example as well, and these perpendicularity errors may be identified by means of any other method.

REFERENCE SIGNS LIST

1 Machine tool
2 Bed
3 Colum
4 Spindle head
5 Spindle
6 Table

The invention claimed is:

1. A method of identifying a relative motion error between a spindle for holding a tool and a table for mounting a workpiece thereon in a three-dimensional space in a machine tool, the machine tool including the spindle and the table and including a Z-axis feed mechanism, an X-axis feed mechanism, and a Y-axis feed mechanism respectively corresponding to a Z-axis, an X-axis, and a Y-axis as reference axes, the Z-axis extending along an axis of the spindle, the X-axis and the Y-axis being orthogonal to the Z-axis and orthogonal to each other, the machine tool being configured such that the spindle and the table are moved relative to each other in the three-dimensional space by the X-axis feed mechanism, the Y-axis feed mechanism, and the Z-axis feed mechanism, the method comprising:

operating the X-axis feed mechanism, the Y-axis feed mechanism, and the Z-axis feed mechanism in a three-dimensional space of the machine tool coordinate system defined with respect to the machine tool at zero position $X_0$, $Y_0$, $Z_0$ respectively set for the X-axis feed mechanism, the Y-axis feed mechanism, and the Z-axis feed mechanism, and measuring following errors with respect to an arbitrary coordinate position in the machine tool coordinate system:
a positioning error in the X-axis direction;
a positioning error in the Y-axis direction;
a positioning error in the Z-axis direction;
translational errors in the X-axis, the Y-axis, and the Z-axis;
angular errors around the X-axis, the Y-axis, and the Z-axis in the X-axis;
angular errors around the X-axis, the Y-axis, and the Z-axis in the Y-axis;
angular errors around the X-axis, the Y-axis, and the Z-axis in the Z-axis; and
perpendicularity errors between the X-axis, the Y-axis, and the Z-axis;

calculating, based on the measured actual error data errors with respect to the arbitrary coordinate position in the machine tool coordinate system, following errors in a three-dimensional space of a set coordinate system having its origin at a reference position $X_a$, $Y_a$, $Z_a$ preset in the machine tool coordinate system:
a positioning error in the X-axis direction in the X-axis feed mechanism;
a positioning error in the Y-axis direction in the Y-axis feed mechanism;
a positioning error in the Z-axis direction in the Z-axis feed mechanism;
translational errors in the X-axis feed mechanism, the Y-axis feed mechanism, and the Z-axis feed mechanism;
angular errors around the X-axis, the Y-axis, and the Z-axis in the X-axis feed mechanism;
angular errors around the X-axis, the Y-axis, and the Z-axis in the Y-axis feed mechanism;
angular errors around the X-axis, the Y-axis, and the Z-axis in the Z-axis feed mechanism; and
perpendicularity errors between the X-axis, the Y-axis, and the Z-axis; and calculating, based on the calculated errors in the three-dimensional space of the set coordinate system, the relative motion error between the spindle and the table in the three-dimensional space of the set coordinate system.

2. The method according to claim 1, wherein measurement of the perpendicularity errors between the X-axis, the Y-axis, and the Z-axis is performed with a double ball bar.

3. The method according to claim 2, wherein the calculated errors in the three-dimensional space of the set coordinate system relates to a spindle center position on a front end of the spindle.

4. The method according to claim 2, wherein the relative motion error between the spindle and the table in the three-dimensional space of the set coordinate system relates to a tip of a tool to be attached to the spindle.

5. The method according to claim 3, wherein the relative motion error between the spindle and the table in the three-dimensional space of the set coordinate system relates to a tip of a tool to be attached to the spindle.

6. The method according to claim 1, wherein the calculated errors in the three-dimensional space of the set coordinate system relates to a spindle center position on a front end of the spindle.

7. The method according to claim 6, wherein the relative motion error between the spindle and the table in the three-dimensional space of the set coordinate system relates to a tip of a tool to be attached to the spindle.

8. The method according to claim 1, wherein the relative motion error between the spindle and the table in the three-dimensional space of the set coordinate system relates to a tip of a tool to be attached to the spindle.

* * * * *